United States Patent [19]

Beck et al.

[11] Patent Number: 5,259,960
[45] Date of Patent: Nov. 9, 1993

[54] REGENERATION AND RECYCLING OF CONTAMINATED SOLUTIONS FROM ALUMINUM AND TIN WASHER PROCESSES

[75] Inventors: Leslie M. Beck, Concord; Cathy R. Nelson, Cleveland Hts., both of Ohio

[73] Assignee: Man-Gill Chemical Company, Cleveland, Ohio

[21] Appl. No.: 905,574

[22] Filed: Jun. 26, 1992

[51] Int. Cl.$^5$ .................... E01D 11/02; E01D 11/04
[52] U.S. Cl. ................... 210/638; 210/684; 210/724; 210/767
[58] Field of Search .............. 210/639, 634, 638, 644, 210/649, 660, 681–688, 703, 704, 705, 724, 725, 767, 776

[56] References Cited

U.S. PATENT DOCUMENTS

| | | | |
|---|---|---|---|
| Re. 31,198 | 4/1983 | Binns | 134/3 |
| 4,014,787 | 3/1977 | Shorr . | |
| 4,094,701 | 6/1978 | Fekete | 134/2 |
| 4,599,116 | 7/1986 | King et al. | 134/2 |
| 4,707,273 | 11/1987 | Halterman et al. | 210/724 |
| 4,812,240 | 3/1989 | Watts | 210/639 |
| 4,863,612 | 9/1989 | Kirman et al. | 210/662 |
| 5,002,645 | 3/1991 | Eastland et al. | 204/157.42 |

Primary Examiner—Frank Sever
Attorney, Agent, or Firm—Renner, Otto, Boisselle & Sklar

[57] ABSTRACT

A process is described for regenerating and recycling a contaminated solution recovered from an aluminum or tin washer process wherein the contaminated solution contains contaminants comprising inorganic soils, organic soils, or both as a result of the use of the solution in the washer process, which comprises (A) regenerating said solution by
  (A-1) extracting said contaminants from the solution in a manner which does not substantially reduce the amount of any chemicals present in the solutions prior to use; and
  (A-2) selectively replenishing chemicals as required; and
(B) recycling the regenerated solution to the washer process. The process of the present invention significantly reduces the amount of waste water containing chemicals which must be discarded or treated in waste treatment facilities. The process also reduces the amount of process chemicals and water necessary for maintaining the washer processes used for aluminum and tin coil and container washer processes.

29 Claims, 1 Drawing Sheet

FIG. 1

REGENERATION AND RECYCLING OF CONTAMINATED SOLUTIONS FROM ALUMINUM AND TIN WASHER PROCESSES

FIELD OF THE INVENTION

The present invention relates to a process for regenerating and recycling contaminated solutions recovered from aluminum or tin washer processes. More particularly, the invention relates to a process for regenerating or recycling contaminated solutions recovered from one or more stages of a multi-stage aluminum or tin plate container or coil washer process.

BACKGROUND OF THE INVENTION

Cleaning is essential as a preliminary to many surface finishing operations. Cleaning is normally required, for example, prior to corrosion, preventive treatments and prior to the application of organic finishes and printing inks to the metal surfaces. Cleaning is especially important in the case of metal surfaces to which organic materials have been applied as an aid to rolling or forming since these materials must be removed in order to obtain a surface which is receptive to printing inks and organic finishes.

Cleaners have been utilized in the manufacture of aluminum and tin plate, drawn and ironed cans. In the manufacture of such cans, circular blanks of aluminum or tin-plated steel are first cupped and then passed through several drawing dies to iron the cup in order to form a unitary sidewall and can bottom structure. These forming operations are assisted, and the dies and metal surface protected by the application of lubricants to the aluminum or tin surface prior to or during the forming operation. Since it is desired to have a clean surface prior to any processing steps such as conversion coating and sanitary lacquer deposition in order to assure adhesion of subsequently applied organic coatings, the cleaning step after forming is critical to a successful manufacturing process.

Aluminum and tin plate cleaning or washer processes utilize and require the disposal of large quantities of water laden with chemical wastes. Because of environmental concerns, the water must be treated to reduce or remove chemicals from the waste stream, and new environmental regulations are requiring industries to spend a great deal of money on new waste treatment facilities.

During the cleaning process, organic soils such as forming and rolling oils, and inorganic soils such as metal fines, natural oxides and corrosion are removed from the metal surfaces. For example, if the metal is aluminum, the cleaning process removes aluminum fines, aluminum oxides and water-soluble aluminum derivatives. When the metal is tin plate, the inorganic soils removed during the cleaning process include tin fines, tin oxide and water-soluble tin derivatives.

The inorganic soils which are present on the aluminum or tin cans are digested by the cleaner and remain in solution as a soluble metal salt. The oils which are utilized in preparing the aluminum or tin-plate coils and cans including forming oils and rolling oils which remain on the can surface are removed by alkaline or acid cleaners, and such organic soils are either insoluble or emulsified and dispersed throughout the cleaning solution. The organic soil must be removed from the surfaces of the cans because these soils are responsible for off flavors in the industry known as Labox. Additionally, incomplete removal of organic soils causes poor lacquer adhesion staining, spotting, or imperfections in subsequent coating and printing operations.

As the container cleaning cycle continues, the inorganic and organic soils accumulate in the cleaning solutions and in subsequent rinse solutions as contaminates. If uncontrolled, these contaminates can render the cleaning solutions and rinse solutions ineffective. The reduction of the contaminates in the cleaning and rinse solutions previously has been achieved through overflowing and/or discarding of the used solutions as fresh, unused solution is added. As noted, these methods of reducing contaminates result in the disposal of large quantities of water laden with chemical wastes. Moreover, this process requires that the cleaning solutions be replaced by fresh water and additional chemicals thereby increasing costs.

U.S. Pat. No. 4,094,701 (Fekete) describes a method for cleaning a tin surface. In particular, Fekete describes a cleaner which is an alkaline aqueous composition containing one or more surfactants and an organic tannin component to inhibit etching of the tin surfaces. The aqueous alkaline compositions are also reported to be useful for cleaning surfaces of other substrates such as steel and aluminum.

U.S. Pat. No. 4,599,116 (King et al) describes aqueous alkaline cleaning compositions for aluminum containers which are effective in removing aluminum fines and organic soils from the aluminum container surfaces. The aqueous alkaline cleaning compositions contain an alkalinity agent, a complexing agent, one or more surfactants and, optionally, foam depressing agents. The patentees also mention the use of a prewash to remove a portion of the aluminum fines and soluble oil prior to the alkaline cleaning stage. The complexing agent is included in the alkaline bath in an amount effective to complex at least some of the metal ions in the operating bath which would otherwise tend to form bath-insoluble precipitates. Examples of the complexing agents include sugar acids and salts such as sodium gluconate and sodium citrate. The surfactants which are included in the alkaline cleaning composition are selected to remove the organic soils present on the substrate being cleaned and to prevent a build-up of such organic soils in the cleaning solution.

Acid cleaners also have been used to clean aluminum surfaces and to remove aluminum fines deposited on the interior and exterior walls of the aluminum containers. U.S. Pat. No. 31,198 (Binns) describes an acidic cleaner for removing and dissolving aluminum fines and lubricating oils from an aluminum surface. The cleaner comprises hydrofluoric acid, sulfuric acid, one or more surfactants and water.

U.S. Pat. No. 4,863,612 (Kirman et al) describes a method and apparatus for recovering ions from an aqueous solution and producing deionized water for reuse. The method and apparatus are particularly useful in a nickel-plating process and involves passing the aqueous solution through a first cation removing assembly which contains a cation exchange present having a high affinity for nickel ions. The water stream leaving the first cation assembly passes through a second cation assembly and then to an anion removing assembly so that deionized water is produced. The first cation assembly is regenerated producing a regeneration solution containing a high concentration of nickel, and the regenerated solution can then be returned to the nickel plating bath. The ions recovered in the second cation removing assembly and the anion removing assembly are recovered and discarded.

U.S. Pat. No. 5,002,645 (Eastland et al) describes a method for separating and recovering metal values from a waste stream containing metal hydroxides, particularly chromium hydroxide. The waste stream is subjected to an oxidation process, pH adjustment, a chelating ion exchange resin and ultrasound. The process is used for separating and recovering metals from electroplating or electroless processes where the metals may be chromium, iron, cobalt, zinc, cadmium, nickel, copper, silver or aluminum.

SUMMARY OF THE INVENTION

A process is described for regenerating and recycling a contaminated solution recovered from an aluminum or tin washer process wherein the contaminated solution contains contaminants comprising inorganic soils, organic soils, or both as a result of the use of the solution in the washer process, which comprises (A) regenerating said solution by
(A-1) extracting said contaminants from the solution in a manner which does not substantially reduce the amount of any chemicals present in the solutions prior to use; and
(A-2) selectively replenishing chemicals as required; and (B) recycling the regenerated solution to the washer process. The process of the present invention significantly reduces the amount of waste water containing chemicals which must be discarded or treated in waste treatment facilities. The process also reduces the amount of process chemicals and water necessary for maintaining the washer processes used for aluminum and tin coil and container washer processes.

THE DRAWING

In the annexed drawing.

DESCRIPTION OF THE PREFERRED EMBODIMENTS

The present invention relates to a process for regenerating and recycling a contaminated solution recovered from an aluminum or tin washer process. Aluminum and tin containers and coils generally have oils, aluminum or tin fines and other contaminants (e.g., aluminum alloy derivatives) adhered to their surface. These contaminants must be removed before the cans or coils can be lacquered, painted, printed, etc. Also, during the wash process chemical conversion coatings can be deposited on the cans or coils to promote adhesion of subsequently applied paints, lacquers and the like, improve mobility, prevent dome discoloration which can occur during the pasteurization of beer, and/or enhance corrosion resistance. A conditioning rinse can be applied to improve cleanliness. Aluminum or tin plate washer processes generally comprise one or more stages such as prewash, cleaner, conditioning, pretreatment and/or rinse stages. Most aluminum or tin plate can washing operations employ six sequential wash or rinse stages:

Stage 1: Prewash
Stage 2: Acid or Alkaline Cleaner
Stage 3: Rinse
Stage 4: Condition or Treatment (conversion coating, mobility enhancing, etc.)
Stage 5: Rinse
Stage 6: Deionized Water Rinse During each stage, a bath containing the desired wash, cleaner or rinse composition is employed. This wash or rinse composition is preferably applied to the cans via spraying although other application techniques such as immersion can be used. Following stage 6, the cans are dried and then conveyed to a work station wherein they are further processed (e.g., printed, lacquered, painted, etc.).

Those skilled in the art will recognize that, in some instances, one or more of the foregoing stages 1–6 can be eliminated, two or more stages can be merged into one, or additional treatment stages can be added. When such modifications are employed, it wig be understood that the process of the present invention can be used to regenerate the solutions used in the modified stages.

Figure 1:
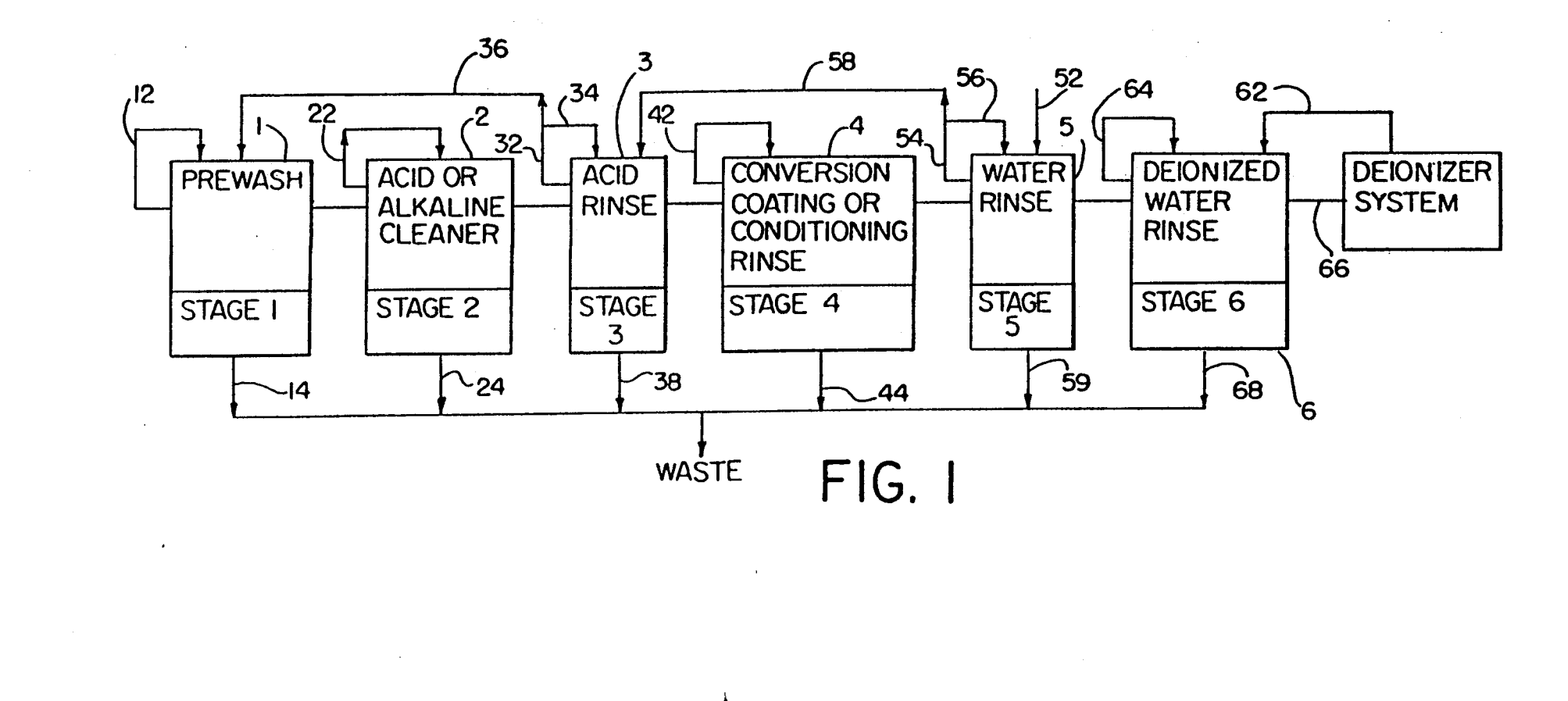
FIGURE 1 is a generalized flow diagram of a typical commercial container washer process.

FIGURE 1 illustrates a typical commercial container cleaner/pretreatment washer system including the various stages and flow pattern. The system comprises a prewash stage 1, an acid or alkaline cleaner stage 2, an acid rinse stage 3, a conversion coating or conditioning rinse stage 4, a water rinse stage 5, a deionized water rinse or optional rinse additive stage 6 and a deionizer system. Aluminum or tin plate containers or coils are cleaned utilizing the typical washer process illustrated in FIG. 1 by advancing the containers or coils through the various stages beginning with the prewash stage.

The prewash stage 1 is used to remove heavy accumulations of oil and aluminum fines from the can surface before entering the acid or alkaline cleaning stage 2. In one embodiment, the prewash is operated at a temperature in the range of about 60° F. to about 150° F., preferably about 80° F. to about 130° F., more preferably about 110° F. to about 120° F., and a pH that is preferably in the range of about 2 to about 5, more preferably about 2.5 to about 3.5. Typically, the cans are sprayed for about 10 to about 60 seconds, more preferably about 20 to about 40 seconds, more preferably about 30 seconds.

Prewash stage 1 generally utilizes an aqueous acid solution such as a dilute aqueous sulfuric acid solution. Fresh acid solution is added continuously to prewash stage 1, and the solution in the prewash stage 1 is continuously recirculated as shown by line 12. A portion of the solution in prewash stage 1 is removed by overflowing or other means and discarded to waste as shown by line 14.

The aluminum or tin plate coil or container then is advanced to an acid or alkaline cleaner stage 2 which contains an acid or alkaline cleaner which is replenished as necessary. In the cleaner stage 2, the acid or alkaline cleaner solution is recirculated continuously as indicated by line 22, and a portion of the used cleaner solution is removed by overflowing and/or other means and discarded to waste as shown by line 24.

The cleaning stage 2 is used to remove the balance of the organic and inorganic soils remaining on the can surface after the prewash, and thus, there is a buildup of such materials in the cleaner solution as the solution is recirculated and reused. Either an acidic or an alkaline cleaner can be used in this step. The organic soils include water-soluble lubricants from the cupper and bodymaker operations, rolling oils, and general shop dirt. The inorganics include aluminum fines and natural oxide or corrosion as well as aluminum alloy constituents (e.g., ferrous and nonferrous derivatives). Aluminum fines are small particles of aluminum which are the result of the aluminum being abraded during the forming operation.

In one embodiment of the invention, an aqueous alkaline cleaner is used during stage 2. These cleaning compositions preferably comprise at least one inorganic base and, optionally, at least one complexing agent. The inorganic base is provided in an amount sufficient to achieve satisfactory removal of aluminum fines from the container surfaces. The complexing agent is provided in an amount sufficient to complex at least some of the metal ions in the operating bath. These ions tend to form undesirable precipitates in the aqueous alkaline medium.

The inorganic base may comprise any one or a combination of bathsoluble compounds including alkali or alkaline earth metal borates, carbonates, hydroxides, phosphates, and mixtures thereof. Alkali metal hydroxides and alkali metal carbonates are preferred materials. A mixture of sodium hydroxide and sodium carbonate can be used. The concentration of the inorganic base is preferably at a sufficient level to remove substantially all of the aluminum fines on the container surfaces while at the same time not unduly etching the aluminum surface so as to provide a clean, bright, reflective appearance. The inorganic base is typically employed at a sufficient concentration to provide an operating pH in the range of about 8 to about 13. Preferably, the pH of the operating cleaning solution is controlled within a range of about 10 to about 13, more preferably about 11.5 to about 12.5, and in one embodiment it is advantageously in the range of about 11.7 to about 12.1. In order to provide the foregoing alkalinity, the inorganic base is typically employed at a concentration of about 0.05 to about 10 g/l with concentrations of about 0.4 to about 3.5 g/l being useful.

The complexing agent may comprise any one or a combination of bathsoluble compounds which are effective to complex at least some of the metal ions present in the operating bath to avoid the formation of deleterious precipitates. For this purpose, sugar acids as well as salts thereof are useful. Included among such complexing agents are gluconic acid, citric acid, glucoheptanoic acid, sodium tripolyphosphate, EDTA, tartaroc acid or the like, as well as the bath-soluble and compatible salts thereof and mixtures thereof. Generally, the concentration of the complexing agent in the operating bath is controlled within a range of about 0.01 up to about 5 g/l with concentrations of from about 0.05 to about 1 g/l being useful.

In another embodiment, an aqueous acidic cleaner is used during stage 2. These acidic compositions generally comprise at least one inorganic acid. Examples of such inorganic acids include sulfuric acid, the hydrohalic acids and mixtures thereof. Hydrofluoric acid is a particularly useful hydrohalic. A source of fluoride ions (e.g., ammonium bifluoride) can be used as an alternative to hydrofluoric acid. Mixtures of sulfuric acid and hydrofluoric acid are useful.

In one embodiment, sulfuric acid is employed in the acidic cleaning composition at a sufficient concentration to maintain the pH between about 0.5 and about 6, preferably about 0.5 and 2.5. Concentrations of sulfuric acid of about 0.1 to about 60 grams/liter, preferably from about 1 to about 10 grams/liter can be used. The concentration of sulfuric acid can be at a level of about 4 to about 8 grams/liter.

In one embodiment, hydrofluoric acid is present in the acidic cleaning composition at a concentration of about 0.005 to about 0.7 gram/liter, preferably about 0.005 to about 0.1 gram/liter. The hydrofluoric acid can be present at a concentration of about 0.01 to about 0.03 gram/liter.

The aqueous alkaline and acidic cleaner compositions may contain at least one surfactant. More often, a combination of at least two surfactants are utilized. The surfactants are used to effect an efficient removal of lubricants and organic soils of the types customarily employed in the drawing and forming of aluminum containers. Combinations of nonionic and anionic surfactants are particularly useful.

The nonionic surfactants may be those containing ether linkages and which are represented by the following general formula wherein R is a hydrocarbon group containing from 6 to 30 carbon atoms, R' is an alkylene group containing 2 or 3 carbon atoms or mixtures thereof, and n is an integer of from 2 to 100. Such surfactants are produced generally by treating fatty alcohols or alkyl-substituted phenols with an excess of ethylene oxide or propylene oxide. The alkyl carbon chain may contain from about 14 to 24 carbon atoms and may be derived from a long chain fatty alcohol such as oleo alcohol or stearyl alcohol.

Nonionic polyoxyethylene surfactants of the type represented by the above formula are available commercially under the general trade designations "Surfynol" by Air Products Chemicals, Inc., "Pluronic" or "Tetronic" by BASF Corp., Chemical Division; "Tergitol" by Union Carbide; and "Surfonic" by Texaco Chemicals. Examples of specific polyoxyethylene condensation products useful in the aqueous alkaline cleaner compositions of the present invention include "Surfynol 465" which is a product obtained by reacting about 10 moles of ethylene oxide with one mole of tetramethyldecynediol. "Surfynol 485" is a product obtain by reacting 30 moles of ethylene oxide with tetramethyldecynediol. "Pluronic L35" is a product obtained by reacting 22 moles of ethylene oxide with propylene glycol; "Tergitol TMN 3" is an ethoxylated trimethylnonanol with an HLB of 8.3, and "Tergitol TMN 6" is an ethoxylated trimethylnonanol with an HLB of 11.7. "Surfonic N95" is an ethoxylated nonyl phenol with an HLB of 12.9 and "Pluronic L61" is a block copolymer of propylene oxide and ethylene with an HLB of from 1 to 7.

Another type of nonionic ethoxylated surfactant which is useful in the aqueous alkaline cleaner solutions used in the present invention are block copolymers of ethylene oxide and propylene oxide based on a glycol such as ethylene glycol or propylene glycol. The copolymers based on ethylene glycol generally are prepared by forming a hydrophilic base by reaction of ethylene oxide with ethylene glycol followed by condensation of this intermediate product with propylene oxide. The copolymers based on propylene glycol similarly are prepared by reacting propylene oxide with propylene glycol to form the intermediate compound which is then condensed with ethylene oxide. By varying the proportions of ethylene oxide and propylene oxide used to form the above copolymers, the properties may be varied. Both of the above types of copolymers are available commercially such as from BASF Chemicals under the general trademark "Pluronic". The condensates based on ethylene glycol are identified as the "R" series, and these compounds preferably contain from about 30 to about 80% of polyoxyethylene in the molecule and may be either liquids or solids. The condensates based on propylene glycol are identified generally by BASF as the "F", "L", or "P" series, and these may contain from about 5 to about 80% of ethylene oxide. The "L" series of propylene glycol based copolymers are liquids, the "F" series are solids, and the "P" series are pastes. The solids and pastes can be used when they are soluble in the aqueous cleaner solutions. The molecular weights of these block copolymers range from about 400 to about 14,000.

Anionic surfactants also may be included in the aqueous acidic or alkaline cleaner compositions.

In one embodiment, the anionic surfactants are sulfates or sulfonates. As examples of suitable anionic detergents there may be cited the higher alkyl mononuclear aromatic sulfonates such as the higher alkyl benzene sulfonates containing from 10 to 16 carbon atoms in the alkyl group and a straight or branched chain, e.g., the sodium salts of decyl, undecyl, dodecyl tridecyl, tetradecyl, pentadecyl or hexadecyl benzene sulfonate and the higher alkyl toluene, xylene and phenol sulfonates; alkyl naphthalene sulfonate, and sodium dinonyl naphthalene sulfonate.

Other anionic detergents are the olefin sulfonates, including long chain alkene sulfonates, long chain hydroxyalkane sulfonates or mixtures thereof. These olefin sulfonate detergents may be prepared, in known manner, by the reaction of $SO_3$ with long chain olefins having 8-25, preferably 12-21 carbon atoms. Examples of other sulfate or sulfonate detergents are paraffin sulfonates, such as the reaction products of alpha olefins and bisulfites (e.g., sodium bisulfite). These include primary paraffin sulfonates of about 10-20, preferably about 15-20 carbon atoms; sulfates of higher alcohols; and salts of α-sulfofatty ester (e.g., of about 10 to 20 carbon atoms, such as methyl α-sulfomyristate or α-sulfotallate).

Examples of sulfates of higher alcohols are sodium lauryl sulfate, sodium tallow alcohol sulfate, or sulfates of mono- or diglycerides of fatty aids (e.g., stearic monoglyceride monosulfate), alkyl poly(ethoxy) ether sulfates such as the sulfates of the condensation products of ethylene oxide and lauryl alcohol (usually having 1 to 5 ethenoxy groups per molecule); lauryl or other higher alkyl glyceryl ether sulfonates; aromatic poly(ethenoxy) ether sulfates such as the sulfates of the condensation products of ethylene oxide and nonyl phenol (usually having 1 to 20 oxyethylene groups per molecule preferably 2-12).

Of the various anionic detergents mentioned, the preferred salts are sodium salts and the higher alkyls are of 10 to 18 carbon atoms, preferably of 12 to 18 carbon atoms. Specific exemplifications of such compounds include: sodium linear tridecyl benzene sulfonate; sodium linear pentadecyl benzene sulfonate; sodium p-n-dodecyl benzene sulfonate; sodium lauryl sulfate; potassium coconut oil fatty acids monoglyceride sulfate; sodium dodecyl sulfonate; sodium nonyl phenoxy polyethoxyethanol (of 30 ethoxy groups per mole); sodium propylene tetramer benzene sulfonate; sodium hydroxy-n-pentadecyl sulfonate; sodium dodecenyl sulfonate; lauryl polyethoxyethanol sulfate (of 15 ethoxy groups per mole); and potassium methoxy-n-tetradecyl sulfate.

A series of sulfate and sulfonate anionic surfactants are available from the Henkel Corporation under the general trade designation "Sulfotex". For example, Sulfotex LAS-90 is reportedly a sodium dodecyl benzene sulfonate and Sulfotex LCX is a sodium lauryl sulfate.

The anionic surfactant may be of the phosphate mono- or diester type. These esters may be represented by the following formulae:

(monoester)

(diester)

wherein R is a fatty chain containing 10 to 18 carbon atoms; each n is independently an integer from 0 to 5; and M is any suitable cation such as alkali metal, ammonium and hydroxyalkyl ammonium.

These types of surfactants are also well known and are commercially available. One series is available from the GAF Corporation under the general trade designation "GAFAC". For example, GAFAC 510 and the G for "R" series are anionic surfactants reported to be free acids of a complex phosphate ester. Sodium and potassium salts of complex phosphate esters also are available under the GAFAC designation.

Anionic surfactants are also available from Rohm & Haas Company under the general trade designation "Triton". For example, Triton H-55 and H-66 are phosphate surfactants (potassium salts); Triton QS-30 and QS-44 are anionic phosphate surfactants in the free acid form; Triton W-30 is a sodium salt of an alkyl aryl polyether sulphate; and Triton DF-20 is a modified ethoxylate.

The amount of surfactant or combination of surfactants included in the aqueous acid and alkaline cleaner compositions is an amount which is effective to remove contaminants from the surface of the container. In one embodiment, this amount is also sufficient to provide a substantially 100% water-break-free surface. A 100% water-break-free surface is achieved when the water "sheets off" leaving a continuous thin layer of water after rinsing. A 100% water-break-free surface represents a surface that is free of lubricants or oils. Typically, the amount of surfactant or combination of surfactants included in the operating or working aqueous acidic or alkaline cleaner will range from about 0.003 to about 5 g/l with concentrations of from about 0.02 to about 1 g/l being useful.

In one embodiment of the invention, mobility enhancers may be applied to the can surface as part of either the aqueous acidic or alkaline cleaning composition. The concentration of the mobility enhancer in such cleaning compositions should be sufficient to provide the can with the desired mobility properties once the can passes through the final rinse stage (stage 6) and is dried. This concentration is preferably in the range of about 0.025 to about 5 g/l, more preferably about 0.025 to about 3 g/l.

The aqueous acidic or alkaline cleaning composition is applied to the can surface at comparatively low to moderate temperatures of generally below about 150° F. to about ambient (i.e., about 60° F.) and preferably within a range of about 90° F. to about 130° F. The contacting of the can may be effected by flooding, immersion, or spraying of which the latter constitutes the preferred technique. In one embodiment, the cans are sprayed for about 10 to about 50 seconds, preferably about 20 to about 30 seconds.

After the containers or coils are subjected to the acid or alkaline cleaner in stage 2, they are advanced to an acid rinse stage 3 where the containers or coil are given a mild aqueous acid rinse. The purpose of the rinse in stage 3 is to completely remove all acidic or alkaline cleaner compositions and soils from the metal surface prior to subsequent treatment. After repeated use of the rinse, it becomes contaminated with such compositions and soils. The acid in the rinse may be an inorganic acid such as sulfuric acid, or when the cleaner in stage 2 is an acid cleaner, the acid in the acid rinse stage 3 may be derived from acids carried over from the acid cleaner stage 2. The solution in the acid rinse stage 3 is continuously recycled as shown by lines 32 and 34, and a portion of the acid rinse may be recycled to the prewash stage 1 as shown by lines 32 and 36. The acid rinse solution in stage 3 may also be replenished with the water rinse solution of stage 5 as indicated by lines 54 and 58. A portion of the solution in the acid rinse stage 3 also is removed and discarded to waste as shown by line 38.

In one embodiment, tap or city water is used as the rinse water and an effective amount of sulfuric acid is added to provide a pH in the range of about 1.5 to about 3, preferably about 1.9 to about 2.1. The temperature of the rinse can be the range of about 70° F. to about 150° F., preferably about 90° F. to about 120° F. In one embodiment, the cans are sprayed for about 1 to about 60 seconds, more preferably about 5 to about 20 seconds, more preferably about 15 seconds.

The acid rinsed containers or coils from the acid rinse stage 3 are advanced to a conversion coating or conditioning rinse stage 4 in which a conversion coating is applied to the containers or cans, or the cans are subjected to a conditioning rinse. A portion of the solution in rinse stage 4 is continuously recirculated as shown by line 42, and a portion of the solution is removed and discarded as shown by line 44.

The conversion coating, when applied, is used to enhance can transport mobility, protect against exterior dome staining which can occur during the pasteurization of beer, provide corrosion resistance, and promote adhesion of subsequently applied organic coatings such as paints, lacquers, printing inks, and the like. The conversion coating treatment, when applied, is applied to at least part of the exterior surface of the can and may be any one that is conventionally available including, for example, treatment solutions based on chromium (e.g., chromium phosphate) or titanium, zirconium, or hafnium, with or without tannin. Exemplary of such conversion coating solutions and processes are those described in U.S. Pat. Nos. 4,017,334; 4,054,466; and 4,338,140, the teachings of which are incorporated herein by reference.

Mobility enhancing chemicals may be included in stage 4 (and stages 5-6 or even stages 2 and 3) to improve the mobility of formed articles such as cans as they are conveyed along a conveyor or trackwork. Compositions have been suggested in the art for improving mobility, and any of these known chemical compositions may be included in the solutions used in stages 2-6.

U.S. Pat. No. 4,859,351; 4,944,889; 5,030,323; 5,064,500; and 5,080,814 describe lubricant and surface conditioners for application to aluminum cans, and the disclosures of these patents are hereby incorporated by reference. The lubricant and surface conditioners disclosed in these patents are water-soluble alkoxylated surfactants, namely, organic phosphate esters; alcohols; fatty acids including mono-, di-, tri-, and polyacids; fatty acid derivatives such as salts, hydroxy acids, amides, esters, ethers and derivatives thereof; and mixtures thereof. The references state that the lubricant and surface conditioner may be applied to the cans during the wash cycle, during one of the treatment cycles, during one of the rinse cycles, or after the final water rinse. Both acidic and alkaline wash cycles are disclosed.

U.S. Pat. No. 5,061,389 discloses a composition and process for reducing the coefficient of friction on the surface of formed metal structures, such as aluminum cans, by lubricating the surface with a blend of a polyethylene glycol ester with a fluoride compound. The disclosure of this patent relative to such blends also is hereby incorporated by reference.

Other chemicals and chemical combinations useful as mobility enhancers may be included in the various stages. For example, products prepared by reacting (A)(I) at least one carboxylic acid or acid-producing compound with (A)(II) ammonia, at least one amine, or at least one alkali or alkaline earth metal are useful mobility enhancers, particularly in the washing and rinsing stages following can formation. The acid-producing compounds (A)(I) may be anhydrides, acid halides or acid esters. Examples of useful acids include saturated and unsaturated fatty acids, mono-, di-, or triglycerides, etc.

Another useful composition which may be included in the wash and rinse stages comprises a mixture of (A) at least one nonionic polyoxyalkylene glycol comprising poly(oxypropylene) hydrophobic groups and poly(oxyethylene) hydrophilic groups, and (B) at least one $C_3$ to $C_6$ alkoxy derivative of at least one nonionic polyoxyalkylene glycol comprising poly(oxypropylene) hydrophobic groups and poly(oxyethylene) hydrophilic groups. Such mobility enhancers and their use are described in U.S. patent application Ser. No. 07/654,819, filed Feb. 13, 1991, and the disclosure of said application is hereby incorporated by reference.

The conditioning rinse, when applied, is used to promote cleanliness of the can surface. In one embodiment, an aqueous composition containing sulfuric acid, hydrofluoric acid and boric acid is used.

In one embodiment, the stage 4 treatment bath has a pH in the range of about 1 to about 4, preferably about 1.8 to about 3, and a temperature in the range of preferably about 60° F. to about 150° F., more preferably about 90° F. to about 150° F., more preferably about 110° F. to about 130° F. The stage 4 treating solution is preferably sprayed on to the cans for about 1 to about 60 seconds, more preferably about 5 to about 20 seconds, more preferably about 10 seconds.

After the containers or coils are conversion coated or conditioned in rinse stage 4, they are then subjected to a water rinse stage 5 which generally utilizes city water which is added to the rinse stage 5 as shown by line 52. The water in the rinse stage 5 is continuously recirculated as shown by lines 54 and 56, and a portion of the used water rinse may be recirculated to the acid rinse stage 3 as shown by lines 54 and 58. Another portion of water rinse in stage 5 is removed and discarded as shown by line 59.

The purpose of the rinse in stage 5 is to remove all residual conversion coating or conditioning rinse chemicals from the can body prior to the final deionized water rinse of stage 6. In one embodiment, the stage 5 water rinse is operated at ambient temperature and a pH in the range of about 2 to about 7, preferably 3 to 5. An inorganic acid, preferably sulfuric acid, is preferably used to achieve the desired pH. In one embodiment, the cans are sprayed for about 1 to about 60 seconds, more preferably about 5 to about 30 seconds, more preferably about 15 seconds.

Following the water rinse with city water, the containers or coils generally are subjected to a deionized water rinse stage 6. In some applications, rinse additives to improve can mobility through track work and other desirable properties may be included in the rinse stage 6. The water within rinse stage 6 is continuously recirculated as shown by line 64, and the used water rinse also is refumed to a deionizer system as shown by line 66 where the water is deionized prior to reentering rinse stage 6. A portion of the water in rinse stage 6 may be removed and discarded to waste as shown by line 68.

Deionized water is tap water (city or well water) from which all or most of the natural mineral salts (calcium, silicates, phosphates, etc.) have been removed by means of ion exchange columns. This stage is typically operated at a pH in the range of about 3 to about 5, preferably about 4 to about 4.5. An inorganic acid such as sulfuric acid is used to provide the desired pH. This stage is generally operated at ambient temperature, and in one embodiment the cans are sprayed for about 1 to about 60 seconds, more preferably about 5 to about 20 seconds, more preferably about 10 seconds.

An antifoaming agent of the type discussed above can be used during one or more of stages 2-6 to avoid objectionable foaming. Similarly, an antimicrobial or biocidal agent of the type discussed above can be added to the aqueous compositions used in any of stages 2-6 to inhibit the growth of microorganisms. In one embodiment, the antifoaming agent and/or the antimicrobial or biocidal agent is combined with a mobility enhancer in any of stages 2-6, and preferably in stage 2 or stage 4.

The cleaning or washing procedure described and illustrated in FIGURE 1 is effective in removing inorganic and organic soils from the containers or coils which are cleaned in the process. As the process is carried out, the inorganic and organic soils accumulate as contaminants in the solutions used in the various process stages. If uncontrolled, these contaminates can build up to undesirable levels and render the bath solutions ineffective for their intended use. In accordance with the present invention, the spent aqueous liquids used in the various stages of the washer process can be regenerated substantially to their nearly fresh or unused condition by removing the inorganic and organic contaminants in a manner which does not have a deleterious effect on the solutions and chemicals contained therein and which also do not significantly reduce the amount of the desired chemicals which are present in the solutions prior to their use. After the contaminants have been removed from the solutions, the chemical content of the solutions may be adjusted as desired, and the regenerated solutions then recycled.

The process of the present invention is effective for removing contaminants from and regenerating the solutions used in any stage of a multi-stage process such as illustrated in FIGURE 1. Alternatively, the process of the present invention may be used to regenerate and recycle contaminated solutions from aluminum or tin plate washer processes which do not involve multiple stages.

The process of the present invention for regenerating or recycling contaminated solutions recovered from aluminum or fin washer processes comprises
(A) regenerating said solution by
(A-1) extracting said contaminants from the solution in a manner which does not substantially reduce the amount of any chemicals present in the solutions prior to use; and
(A-2) selectively replenishing chemicals as required; and
(B) recycling the regenerated solution to the washer process. In one preferred embodiment, the process of the present invention is used for regenerating and recycling contaminated solutions recovered from multi-stage aluminum or fin plate washer processes such as illustrated above in FIG. 1 either on a batch or continuous basis.

A critical feature of the regeneration of the contaminated solution is the extraction and removal of said contaminants from the solution in a manner which does not substantially reduce the amount of any chemicals present in the solution prior to use. That is, the extraction process should be substantially non-destructive with regard to the useful chemicals which may be present in the solution being regenerated. The preferential removal of the contaminant while leaving the desired chemicals unaffected permits the regeneration of the solutions at minimum expense since it is not required to add large amounts of desirable chemicals in order to regenerate the solution.

The contaminants can be extracted from the used solutions in accordance with the present invention by various techniques such as
(a) ion exchange resin adsorption;
(b) filtration;
(c) precipitation;
(d) deposition of metal on a reactive substrate;
(e) electrowinning; or
(f) a combination of one or more of (a) through (e).

A choice of extraction procedure will depend on the nature of the contaminant to be removed. Also, a combination of procedures may be utilized to remove organic as well as inorganic soils.

The following discussion and examples generally relate to the use of the process of the present invention on aluminum. However, the process of the invention is equally applicable to regeneration and recycling of solutions used in washing tin, and in particular, tin plate.

In one embodiment, contaminants are extracted from the used solutions through the use of ion exchange resins. Various types of ion exchange resins can be utilized including cation as well as anion exchange resins. Cation exchange resins in various form such as the hydrogen or salt form (e.g., sodium) may be utilized. The selection of a particular ion exchange resin is based upon the contaminants desired to be extracted from the used solution. The ion exchange resin which is best suited for extracting specific contaminants can be readily determined by one skilled in the art. The ion exchange resin selected for extracting metals from the solutions also will depend upon the type of solution being treated. For example, if the used solution is an alkaline cleaner solution, the ion exchange resin should be inert to the alkaline cleaner solution. Likewise, if the solution being treated with the ion exchange resin is an acidic solution, the resin should be inert to such acidic solutions.

The cation exchange resins are particularly useful for extracting heavy metal ions such as aluminum, tin, zinc, copper, iron, cadmium, lead, mercury, etc., from the used aqueous solutions. The anion exchange resins are useful for removing various anions from the used solutions including organic molecules.

Ion exchange resins which are useful in the process for the present invention are available from a variety of commercial sources. For example, a group of useful ion exchange resins are commercially available from Rohm & Haas under the general trade designation Amberlite ®. The Amberlite ® resins include resins of the sulfonated polystyrene type and acrylic type. Specific examples of cation exchange resins include Amberlite ®200, Amberlite ® IR-120 plus, Amberlite ® IR-122 and Amberlite ® IRC-718. The cation exchange resins are available in the hydrogen (acidic) or sodium form. Mixtures of such cationic resins also can be utilized. An example of an anion exchange resin is Amberlite ® IRA-458 which is an acrylic type, strongly basic anion exchange resin available in the chloride salt form. Amberlitel ® IRA-910 is another strong base anion exchange resin. Mixtures of anion exchange resins and mixtures of the anion and cation exchange resins may be utilized in the process of the present invention.

Inorganic contaminants such as aluminum and aluminum salts may be extracted from the used solutions in accordance with the process of the present invention by contacting the used solution with the ion exchange resin for a period of time sufficient to extract the desired amount of the contaminant from the used solution. In a preferred embodiment, the used solution is passed through a bed of the resin or a column to provide the desired contact and exchange reaction. The depth of the bed or column, and the period of contact can be adjusted to provide sufficient contact to extract the desired amount of metal from the used solution.

The used ion exchange resins may be regenerated for reuse by techniques known to those skilled in the art. For example, a used cation exchange resin can be regenerated by contact (washing) with a dilute aqueous acid solution such as dilute hydrochloric or dilute sulfuric acid (e.g., from 1 to 10% acid). If the used resin is in a column, the dilute acid is passed through the column at rates recommended by the manufacturer. Anion exchange resins can be regenerated by the addition of an aqueous base such as a dilute solution of sodium hydroxide. The solutions recovered from the regeneration process contain the contaminants, and these solutions are generally discarded.

The following examples illustrate the use of ion exchange resins for reducing the metal content of the used solution. Unless otherwise indicated in the following examples and elsewhere in the specification and claims, all parts and percentages are by weight, temperatures are in degrees Centigrade, and pressure is at or near atmospheric pressure.

Throughout this application, the term "reaction product" or "RP" refers to the amount of aluminum or tin metal, or other metal, present in the used solution. $RP_i$ refers to the RP value of a used solution prior to treatment in accordance with this invention, and $RP_f$ refers to the RP value of a used solution after treatment.

The RP values for alkaline cleaner baths are determined as follows. The free alkalinity (FA) of the solution is determined by adding five drops of phenolphthalein indicator to a 10 ml. sample followed by titration with 0.10N sulfuric acid until the solution remains colorless for 15 seconds. The milliliters of titrant used indicates the FA value. To the above titrated sample, there is added 10 ml. of 3M potassium fluoride producing a red color. This sample is then titrated with 0.10N sulfuric acid until the solution becomes colorless. The milliliters of titrant used indicates the RP value. An RP value of 1 is equivalent to 95 ppm of aluminum.

The RP value for an acid cleaner bath is determined by adding 10 ml. of 3M potassium fluoride and 5 drops of phenolphthalein indicator to 10 ml. of the bath. The sample is titrated with 0.1N sodium hydroxide until a faint pink color develops and persists for 15 seconds. The milliliters of titrant used indicates the free acid (FA) value. The total acid (TA) of the bath is determined by adding 5 drops of phenolphthalein indicator to a 10 ml. bath sample. The sample is titrated with 0.10N sodium hydroxide until a pink color develops and persists for 15 seconds. The milliliters of titrant used indicates the total acid value. The RP value is determined by the equation $$RP = TA - FA$$

As noted above, an RP value of 1 is equivalent to 95 ppm. of aluminum.

EXAMPLE 1

Alkaline cleaner baths which have been used in an alkaline cleaning process of aluminum beverage cans are passed through a resin bed (or column) at a flow rate of about 15-20 ml./min. The alkaline cleaning bath is a blend of sodium hydroxide, potassium hydroxide, sodium gluconate, nonyl phenol ethoxylate, a block copolymer of ethylene oxide/propylene oxide, a phosphate ester anionic surfactant and water. The used alkaline cleaner baths have high reaction product ($RP_i$) values ranging from about 16 to 20 mls. Several resins are used in this example and for each resin, several runs are made to gather values over a range and to provide an average. The RP content of each of the baths is determined before and after each through-put. The results are summarized in the following Table I.

TABLE I

| Resin | $RP_i$ | $RP_f$(Range) | $RP_f$(Ave.) |
|---|---|---|---|
| IRC-718 | 18.6 | 4.5–16.1 | 10.97 |
| IR-458 | 17.3 | 1.4–16.3 | 12.11 |
| IR-120 plus | 19.2 | 0.2–17.9 | 6.31 |
| IR-718/458 | 16.7 | 0.9–15.2 | 8.68 |

EXAMPLE 2

This example is similar to Example 1 except that the used cleaner bath is an acid cleaning bath used in cleaning aluminum beverage cans. The acid bath comprises a blend of sulfuric acid, an alkyl polyether, an ethoxylated rosin, hydrofluoric acid and water. The ion exchange resin used in this example is Amberlite IR-200 from Rohm & Haas. The used bath has an $RP_i$ value of 14.4 mls. Several runs are made to gather values over a range and to compute an average. In this example, a range of $RP_f$ values of 0.2-4.9 is obtained and the average $RP_f$ value is 2.97.

The solutions which have been used in the aluminum and tin washer processes described above may contain solid materials dispersed throughout the used solution and/or dissolved materials which can be precipitated from the used solutions and which can be extracted from the solutions by filtration. Various filtration procedures have been described and are known to those skilled in the art for removing suspended solids from dispersions, suspensions, etc., and any of these filtration techniques can be utilized. A variety of such procedures is described in Kirk-Othmer, *Concise Encyclopedia of Chemical Technology*, pp. 478-480, J. Wiley & Sons, Inc., 1985, and this disclosure is hereby incorporated by reference.

Filtration can be accomplished by cake filtration or depth filtration. In cake filtration, solids form a filter cake on the surface of the filter medium. In depth filtration, solids are trapped within the medium using either cartridges or granular media such as sand or anthracite coal. In the depth filtration technique, also called bed filtration, gravity flow as well as pressure operation may be used. Filtration also can be accomplished by centrifugal force or by ultra-filtration which involves a cross-flow filtration that is actually a classification based on molecular size.

Filterability of dispersions and suspensions may be affected by changes in the feed characteristics or feed treatments such as average particle size of solids; agitation and pumping; age, pH and temperature of slurry; flocculation by addition of flocculant; heat-treating or freeze-thawing; viscosity and vapor pressure of the liquid; filter thickening; and mixtures of filter aids.

Various filter media are known in the art which may be utilized to improve on the effectiveness of the filtration process. Woven as well as non-woven fabrics have been suggested, and these may include cotton, cotton-/cellulose, and synthetic polymers such as polypropylene, nylon or polyethylene, polyesters, Dynel, Kynar, Orlon, Saran and Teflon. The filtering characteristics of woven fabrics depend primarily on the type of yarn and weave. The yarns may be monofilaments, multi-filament, spun from staple fiber, or a combination of the latter two. The non-woven media include felts which comprise a major portion of the non-woven filters. Felts are available and most of the same fibers as a woven cloth described above, polypropylene being the predominating fiber.

When ultra-filtration is to be utilized, the ultra-filtration membranes generally are porous, asymmetric, polymeric structures produced by phase and version. Commonly used polymers include cellulose acetates, polyamides, polysulfones, poly(vinyl chloride-acrylonitriles) and poly(vinylidene fluoride). Filter aids such as finely divided powders, may be utilized to assist and improve filtration. The powder facilitates filtration by forming a porous bed on the filter media. Examples of finely divided powder materials useful as filter aids include silica, talc, kaolin, diatomaceous earth, montmorillonite, etc.

EXAMPLES 3-8

These examples illustrate the use of various filter media to reduce the RP value of an alkaline cleaner bath used to clean aluminum cans. The alkaline bath is similar to the bath described in Example 1. The pH of the cleaner bath is lowered with sulfuric acid to about 10 to allow aluminum and other alloy constituents (e.g., ferrous, and other metal derivatives) present in the solution to precipitate and/or flocculate, and the solution is then filtered. Chemical analysis is performed to determine the RP value before and after the filtration process. The details and results of these examples are summarized in the following Table II.

TABLE II

| Ex. | Filter Media | Source | Micron Size | $RP_i$ | $RP_f$ (range) | $RP_f$ (ave) |
|---|---|---|---|---|---|---|
| 3 | Cotton liner | Schleicher & Schuell | 8-12 | 18.1 | 1.9-15.5 | 5.31 |
| 4 | Cotton cellulose | Whatman #4 | 20-25 | 18.9 | 1.3-5.8 | 2.82 |
| 5 | Wood pulp | Schleicher & Schuell | 8-12 | 20.6 | 1.1-16.4 | 8.47 |
| 6 | Polypropylene | Delta Pure | 10 | 17.9 | — | 5.2* |
| 7 | Polypropylene | Delta Pure | 3 | 17.6 | — | 15.2* |
| 8 | Natural cotton | Delta Pure | 0.5 | 16.5 | — | 0.8* |

*Note that these values are not averages.

Dissolved contaminates present in the solutions used in the various stages of the washer processes described above may also be removed by precipitation of the contaminates followed by decantation, filtration, settling, centrifuging or other separation techniques. Various procedures may be utilized to effect precipitation of the soluble contaminants such as water-soluble salts of aluminum and tin, and examples of useful procedures include pH adjustment (e.g., pH reduction in alkaline cleaner systems), cooling or freezing and thawing of the solutions to precipitate contaminants which are water-insoluble at the lower temperatures, fluoride addition to precipitate insoluble fluoride salts, addition of reducing agents, addition of oxidizing agents, coalescence, by, for example, addition of flocculants, etc.

In some instances, precipitation of contaminants can be effected by adjusting the pH of the used solution. For example, if the solution is a used alkaline cleaner solution, precipitation can be effected by reducing the pH of the solution by the addition of an acid such as sulfuric acid or hydrochloric acid. When the used solution is an acid solution, precipitation may be effected by raising the pH by the addition of an alkaline material such as sodium hydroxide, potassium hydroxide, etc. The precipitates then can be separated from the remaining cleaner solution by settling, centrifuging, filtration or other separation technique thereby reducing contaminants, and in particular, RP in the used solution. A combination of pH adjustment and cooling or freezing also is effective in precipitating contaminants from used solutions.

EXAMPLE 9

In this example, an alkaline cleaner solution (similar to alkaline cleaner of Example 1) which has been used for cleaning aluminum cans is adjusted to a pH of about 10 by the addition of sulfuric acid, and any solids which are formed are allowed to settle. The supernatant liquid is decanted from the precipitate and is analyzed for RP. Other samples of the used solution which has been adjusted to a pH of about 10 are cooled to 4° C. (40° F.) and other samples are cooled to the freezing point of the solution and then allowed to thaw. The solids are allowed to precipitate and/or floc out of the samples. The supernatant liquid is decanted from the precipitates and analyzed for RP. The results are summarized in the following Table III.

TABLE III

| Example | Settling Method | Hours | $RP_i$ | $RP_f$ |
|---------|-----------------|-------|--------|--------|
| 9A | Room temperature | 0.5 | 18.1 | 8.7 |
| 9B | Room temperature | 1 | 18.1 | 5 |
| 9C | Freeze | 0.5 | 18.1 | 2.3 |
| 9D | Freeze | 1 | 18.1 | 4.4 |
| 9E | Cooling | 0.5 | 18.1 | 9.2 |
| 9F | Cooling | 1 | 18.1 | 4.8 |

Precipitation of the contaminants from the used solutions in accordance with the present invention also can be accomplished by the addition of polymeric substances which are effective as flocculants and which can be removed by precipitation and filtration (e.g., ultrafiltration). The polymeric materials generally are cationic or anionic polymers including cationic polyamities and anionic polyamides. Specific examples of commercially available flocculants which are useful for precipitating the contaminants in accordance with the present invention include Magnifloc ® 1883A, an anionic polyacrylamide in a water-in-oil emulsion available from American Cyanamid Company, Wayne, N.J.; Magnifloc ® 1820A, an anionic polyacrylamide in a water-in-oil emulsion; Magnifloc ® 581C, a cationic polyamine; and Magnifloc ® 591C, a cationic polyamine. The amount and type of polymer added to the used solutions to effect precipitation may be varied over a wide range and is dependent, in part, on the nature of the solution, the nature of the contaminants and the type of polymer added to the solution. In general, amounts of from about 1 to about 50 ppm of the polymer are effective in precipitating the contaminants from the used solutions.

EXAMPLES 10-15

To an alkaline cleaner bath similar to the alkaline bath of Example 1 which has been used for cleaning aluminum cans, there is added a cationic polyamine, or an anionic polyacrylamide, and the pH of the solution is reduced to about 10 by the addition of sulfuric acid. After allowing the precipitate or flocculate to settle, the mixture is filtered and the filtrate is analyzed. The untreated used alkaline cleaner solution has an RP of 19.5. The identification of the polymers, the amounts of the polymers used in the examples, and the results obtained are summarized in the following Table IV.

TABLE IV

| Example | Magnifloc ® Polymer | Amount (ppm) | $RP_f$ |
|---------|---------------------|--------------|--------|
| 10 | 591C | 1 | 11.9 |
| 11 | 591C/1883A | 1/1 | 10.5 |
| 12 | 581C | 10 | 4.5 |
| 13 | 581C | 20 | 4.3 |
| 14 | 581C/1820A | 20/25 | 4.8 |
| 15 | 1820A | 25 | 3.9 |

Precipitation of the dissolved contaminants may also be affected by the addition of an oxidizing agent to the used solutions recovered from the washer processes. Examples of oxidizing agents which may be added include potassium perborate, sodium nitrate, sodium nitrite, and hydrogen peroxide. Hydrogen peroxide is a preferred oxidizing agent. Alternatively, dissolved contaminants may be precipitated by the addition of a reducing agent such as ferrous sulfate, sodium bisulfite, etc.

EXAMPLES 16

This example illustrate the use of an oxidizing agent to lower the overall RP of an alkaline cleaner solution used to clean aluminum containers. A sample of a used alkaline cleaner bath similar to the bath described in Example 1 and having an $RP_i$ of 18.6 is treated with 1% by weight hydrogen peroxide (30% solution) for 18 hours and filtered. The filtrate has an $RP_f$ value of 15.5.

EXAMPLES 17-19

These examples illustrate the use of reducing agents to reduce the overall RP of a used alkaline cleaner. Samples of a used alkaline cleaner similar to the cleaner described in Example 1 having an $RP_i$ of 18.6 are treated with ferrous sulfate and sodium bisulfite at the concentrations and over a period of time as summarized in Table V. The results summarized in Table V indicate significant lowering of the RP value when the used alkaline cleaner solutions are treated with these reducing agents.

TABLE V

| Example | Agent | Hours | $RP_i$ | $RP_f$ |
|---------|-------|-------|--------|--------|
| 17 | 5% $FeSO_4$ | 16 | 18.6 | 16.8 |
| 18 | 0.4% $NaHSO_3$ | 5 | 18.6 | 5 |
| 19 | 0.6% $NaHSO_3$ | 5 | 18.6 | 3.8 |

EXAMPLE 20

A sample of the used alkaline cleaner bath described in Example 16 is treated with 0.02% by weight of fluoride ion added as PLN-130 (a proprietary blend of sulfuric and hydrofluoric acids available from Man-Gill Chemical Company). After a period of one hour, the $RP_f$ value is 15.1.

EXAMPLE 21

The procedure of Example 20 is repeated using 0.04% fluoride ion, and the $RP_f$ value is 10.7.

The used solutions recovered from aluminum and fin washer processes also may be regenerated by extracting dissolved aluminum and tin derivatives by effecting a reaction between the dissolved derivatives and a reactive substrate whereby the soluble derivative is deposited on the substrate. In one embodiment, dissolved aluminum derivatives may be removed from used solutions such as alkaline cleaner solutions by effecting a reaction of the soluble derivative with glass which may be immersed in the solution. Although not wishing to be bound by any theory, it is believed that the soluble form of aluminum takes part in a substitution reaction whereby the aluminum forms aluminosilicates upon reaction with the borosilicate glass. A portion of the aluminosilicate appears to be deposited on the borosilicate glass and additional aluminosilicate is formed in the used bath in the vicinity of the borosilicate glass. The process results in the lowering of the RP value of the used bath.

EXAMPLE 22

A sample of a used alkaline cleaner bath similar to the bath described in Example 1 is acidified with sulfuric acid to a pH of about 10 in a stainless steel beaker, and a glass substrate (a borosilicate with 5% boron oxide) is submerged in the solution for 90 minutes. At the end of this period, a white coating is deposited on the glass, the solution appears to contain a white floc around the glass substrate, and the supernatant portion of the solution is clear. A sample of the supernatant solution is taken and found to have an RP value of 4.4.

As mentioned above, the contaminants present in the solutions recovered from the wash process may and often do contain organic contaminants such as oil including forming oils and rolling oils. Such oils may be extracted from the used baths by various techniques including filtration, thermal separation of the oil from the solution followed by filtration, skimming, or both, etc. The use of filter aids such as finely divided powders and filter media may be used to assist and improve filtration. The powders facilitate filtration by forming a porous bed on the filter media. Examples of finely divided powders useful as filter aids include silica, talc, diatomaceous earth, montmorillonite, etc. The filter media may be any of the media described above including woven as well as non-woven fabrics. Felt, cotton, wood pulp, cotton cellulose, and polypropylene are particularly useful as filter media in the filtration process for removing organic oils from the used solutions.

EXAMPLES 23-25

A used prerinse bath from a washer process containing 8% forming lubricant (Quaker 602Lv), 500 ppm of emulsifying surfactant, sulfuric acid and water and having a pH of about 2.3 is heated to about 50°-55° C. with agitation to insure a homogeneous sample. Samples are poured into a graduated cylinder and filtered through the filter media as noted in Table VI. The amount of oil contained in the filtrate is determined, and the results are summarized in the following Table VI. The amount of oil contained in the bath is reduced after filtration.

TABLE VI

| Example | Filter | Oil (ml) in Filtrate | % Oil in Filtrate |
| --- | --- | --- | --- |
| Control | none | 11 | 8 |
| 23 | 50 micron felt | 2 | 1.4 |
| 24 | 3 micron felt glazed | <1 | <0.7 |
| 25 | 25 micron polypropylene | 6 | 4.4 |

Methods such as electrowinning can be effective at reducing the amount of metals present in the process solutions. Electrowinning techniques are effective with metals such as tin, lead, cadmium, copper, gold, silver, zinc and aluminum. Electrowinning is a method of metal recovery and/or migration, based on mass transfer and electrochemical reactions. Mass transfer is the mechanism by which ions or molecules are transported from the bulk of a solution to the electrode surface layer. There are three forces which cause ions or molecules to migrate toward an electrode surface:
1. Diffusion
2. Electrostatic attraction
3. Mechanical or convective forces The surface area of the electrode is directly proportional to the efficiency of the electrodes recovery and/or migration of the metal. The feasibility of recovery or migration of a specific metal is based on the chemical solution and the potential of the electrode.

Combinations of the various extraction procedures described above may be used. For example a used solution containing organic soils such as forming or rolling oils, aluminum fines and dissolved aluminum derivatives may be treated serially (a) to remove the oil and aluminum fines and (b) to remove dissolved derivatives. In this embodiment the used solution may be (a) first subjected to a thermal separation followed by filtration with a filter media and, optionally, a filter aid to remove oils and suspended solids such as aluminum fines, and thereafter (b) the solution is subjected to one or more of the techniques described above for removing dissolved derivatives contained in the used solutions. For example, the dissolved derivatives may be extracted by ion exchange resins, precipitated by addition of a flocculant, reducing agent, or oxidizing agent and filtered, etc.

After the contaminants have been extracted from the contaminated solutions recovered from an aluminum or tin washer process, the solutions may be regenerated by selectively replenishing chemicals as required. For example, when the solution which has been treated to extract the contaminants is an alkaline cleaner solution such as described in Example 1 above, the solution which remains after extraction of the contaminants may be deficient in one or more of the chemicals normally used in the alkaline cleaner solution. In such instances, it is desirable that any deficiency in chemical content be replenished prior to reuse of the solution. The concentration of the various chemicals in the bath and the amount of chemicals required to be added can be readily determined by one skilled in the art. On the other hand, if the used solution recovered from a water process for extraction of the contaminants is recovered from a water-rinse stage containing no chemicals, the replenishing step is not necessary and the solution after extraction of the contaminants may be recycled directed to the rinse stage.

As a result of the process of the present invention, the amount of the solutions used in the various stages of an aluminum or tin washer process which must be discarded to waste can be significantly reduced because the invention provides a method for regenerating the used solution by extracting the contaminants contained therein and thereafter recycling the purified solutions thereby minimizing or eliminating the need to discard volumes of used solutions to waste. In addition to reducing the waste problems, the present invention also provides a reduction in the cost of operating an aluminum or tin washer process since the spent solutions containing costly chemicals do not have to be discarded and replaced by fresh solutions with the added cost of such replacements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process comprising: regenerating and recycling, a contaminated solution recovered from an aluminum or tin washer process wherein the contaminated solution contains contaminants comprising inorganic soils, organic soils, or both as a result of the use of the solution in the washer process, by,
    (A) regenerating said solution by
        (A-1) extracting said contaminants from the solution in a manner which does not substantially reduce the amount of any chemicals present in the solutions prior to use; and (A-2) selectively replenishing chemicals as required; and (B) recycling the regenerated solution to the washer process.

2. The process of claim 1 wherein the solution is regenerated by extracting the contaminants in (A-1) by,
   (a) ion exchange resin adsorption;
   (b) filtration;
   (c) precipitation;
   (d) deposition of metal on a reactive substrate;
   (e) electrowinning; or
   (f) a combination of one or m of (a) through (e).

3. A process comprising: regenerating and recycling a contaminated solution recovered from a multistage aluminum or tin plate washer process comprising cleaner, conditioning, pretreatment and/or rinse stages wherein the contaminated solution contains contaminants comprising inorganic soils, organic soils, or both as a result of the use of the solution in the washer process by,
   (A) regenerating said solution by
      (A-1) extracting said contaminants from the solution in a manner which does not substantially reduce the amount of chemicals present in the solutions prior to use; and
      (A-2) selectively replenishing chemicals as required; and
   (B) recycling the regenerated solution to the pretreatment, cleaner, conditioning, or rinse stage of the container washer process.

4. The process of claim 3 wherein the solution is recovered from a container or coil line washer process.

5. The process of claim 3 wherein the solution is regenerated by extracting the contaminants in (A-1) by
   (a) ion exchange resin adsorption;
   (b) filtration;
   (c) precipitation;
   (d) deposition of metal on a reactive substrate;
   (e) electrowinning; or
   (f) a combination of one or more of (a) through (e).

6. The process of claim 3 wherein the solution which is regenerated is an alkaline cleaner solution.

7. The process of claim 3 wherein the solution which is regenerated is an acid cleaner solution.

8. The process of claim 3 wherein the solution which is regenerated is a rinse, conditioner or pretreatment solution.

9. The process of claim 3 wherein said contaminants comprise organic oil, and the oil is extracted in step (A) by filtration.

10. The process of claim 3 wherein said contaminants comprise organic oil, and the oil is extracted in step (A) by thermal separation of the oil from the solution followed by filtration, skimming, or both.

11. The process of claim 3 wherein said contaminants comprise inorganic soil, and the inorganic soil is extracted by ion exchange resin adsorption.

12. The process of claim 3 wherein said contaminants comprise inorganic soil, and the inorganic soil is extracted by precipitation, settling or filtration.

13. A process comprising: regenerating and recycling contaminated cleaner or rinse solutions recovered from a multi-stage aluminum container or roil washer process wherein the contaminated solution contains contaminants comprising inorganic soils, organic soils, or both as a result of the use of the solution in the washer process by,
   (A) regenerating said solution by
      (A-1) extracting said contaminants from the solution in a manner which does not substantially reduce the amount of any chemicals present in the solution prior to use; and
      (A-2) selectively replenishing chemicals as required; and
   (B) recycling the regenerated solution to the cleaner or rinse stage of the container washer process.

14. The process of claim 13 wherein the cleaning solution is regenerated in step (A-1) by extracting the contaminants by
   (a) ion exchange resin adsorption;
   (b) filtration;
   (c) precipitation;
   (d) deposition of metal on a reactive substrate;
   (e) electrowinning; or
   (f) a combination of one or more of (a) through (e).

15. The process of claim 13 wherein the solution is an alkaline cleaner solution.

16. The process of claim 13 wherein the solution is an acid cleaner solution.

17. The process of claim 13 wherein the solution is an aqueous rinse solution.

18. The process of claim 13 wherein the organic soils comprise forming or rolling oils.

19. The process of claim 13 wherein the inorganic soils comprise aluminum fines, aluminum oxides, and water-soluble aluminum derivatives.

20. The process of claim 13 wherein the inorganic soils are extracted in step (A-1) by ion exchange resin adsorption.

21. The process of claim 13 wherein the contaminants comprise inorganic soil which is extracted in step (A-1) by precipitation and filtration.

22. The process of claim 13 wherein the inorganic soils are extracted by deposition on a reactive substrate.

23. A process comprising: regenerating and recycling a contaminated cleaner solution recovered from the cleaner stage of a multi-stage aluminum container washer process where the contaminated solution contains contaminants comprising inorganic soils and organic soils as a result of the use of the solution in the cleaner stage by,
   (A-1) regenerating said solution by
      (A-1-a) extracting the organic soils by filtration;
      (A-1-b) extracting the inorganic soils by ion exchange resin absorption, deposition on a reactive substrate, or precipitation and filtration; or
      (A-1-c) combinations of (A-1) and (A-2); and
   (A-2) selectively replenishing any chemicals as required; and
   (B) recycling the regenerated solution to the cleaner stage of the container washer process.

24. The process of claim 23 wherein the cleaner solution is an alkaline cleaner solution.

25. The process of claim 23 wherein the cleaner solution is an acid cleaner solution.

26. The process of claim 23 wherein the cleaner solution is an alkaline cleaner solution, and the inorganic soils are extracted in step (A-1-b) by precipitation and filtrating and wherein precipitation is aided by reducing the pH of the contaminated solution to about 10 by the addition of an acid.

27. The process of claim 23 wherein the inorganic soils are extracted in step (A-1-b) by ion exchange resin adsorption.

28. The process of claim 23 wherein the inorganic soils are extracted in step (A-1-b) by deposition on a reactive substrate.

29. The process of claim 23 wherein the inorganic soils are extracted by contact with a cationic polymer, an anionic polymer, or mixtures thereof.

* * * * *